May 15, 1951  R. P. NORTON  2,552,998
MACHINE FOR REFACING PIPE FITTINGS
Filed Aug. 2, 1946  2 Sheets-Sheet 1
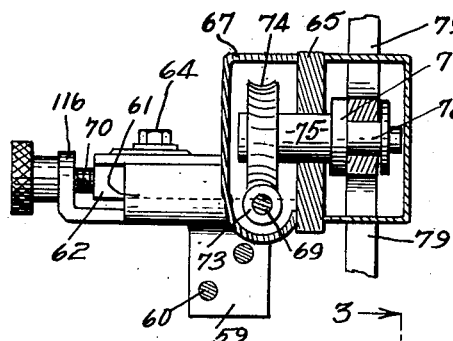
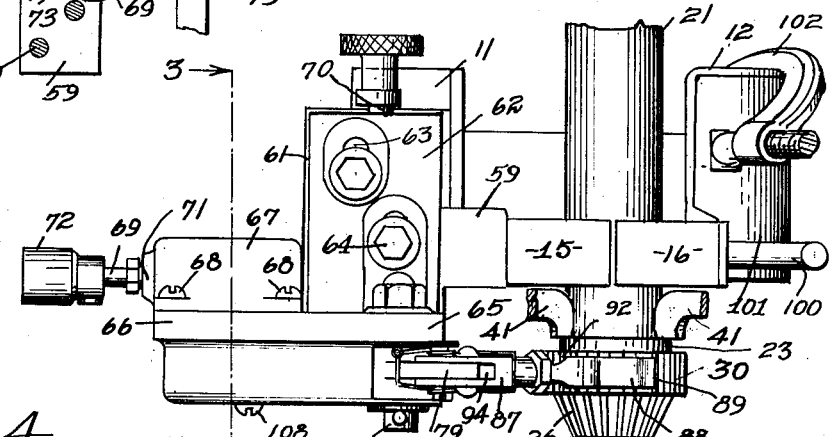
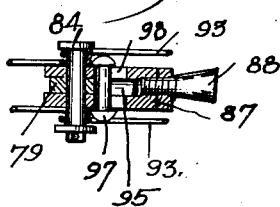
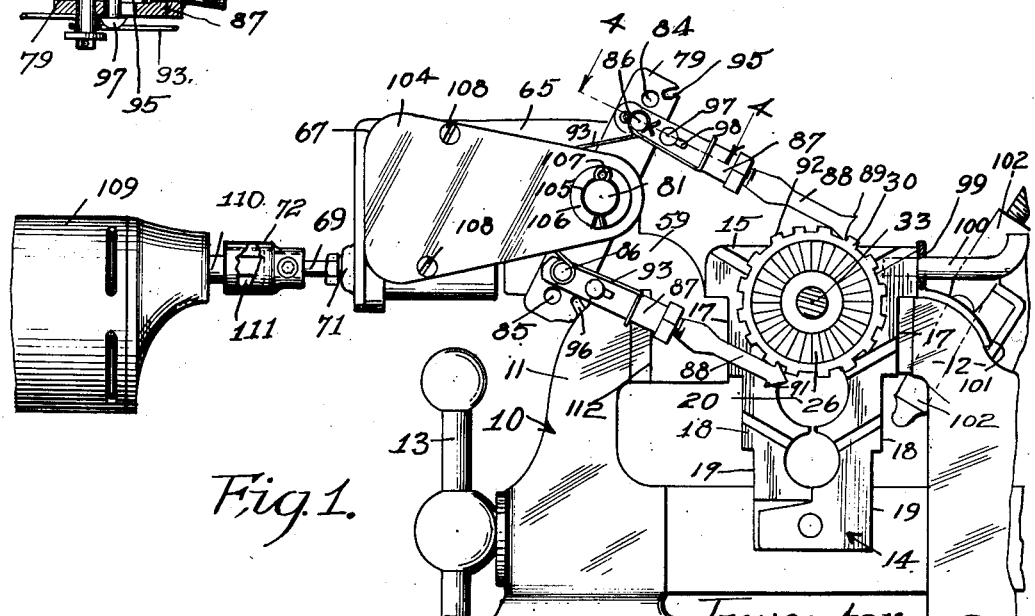
Inventor
Raymond P. Norton.
by Alfred G. Hague atty May 15, 1951     R. P. NORTON     2,552,998
MACHINE FOR REFACING PIPE FITTINGS
Filed Aug. 2, 1946     2 Sheets-Sheet 2
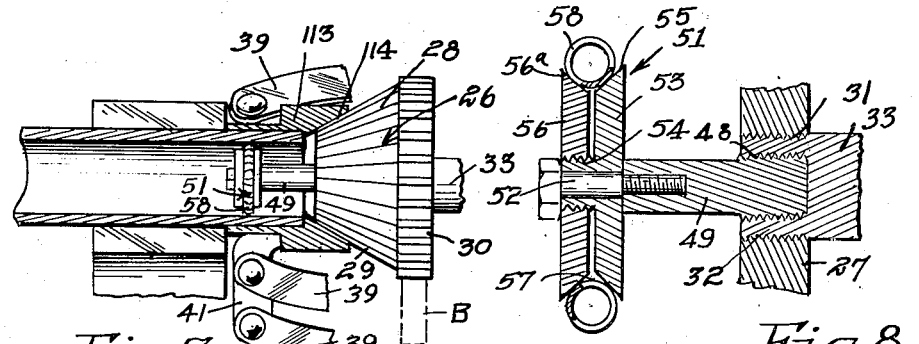
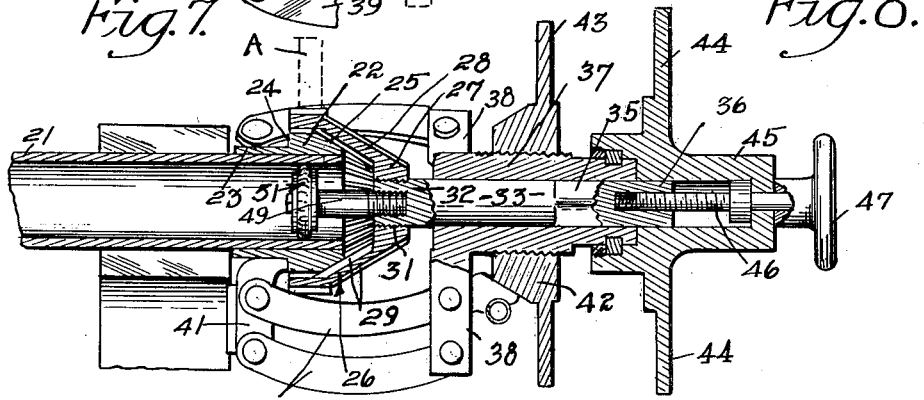
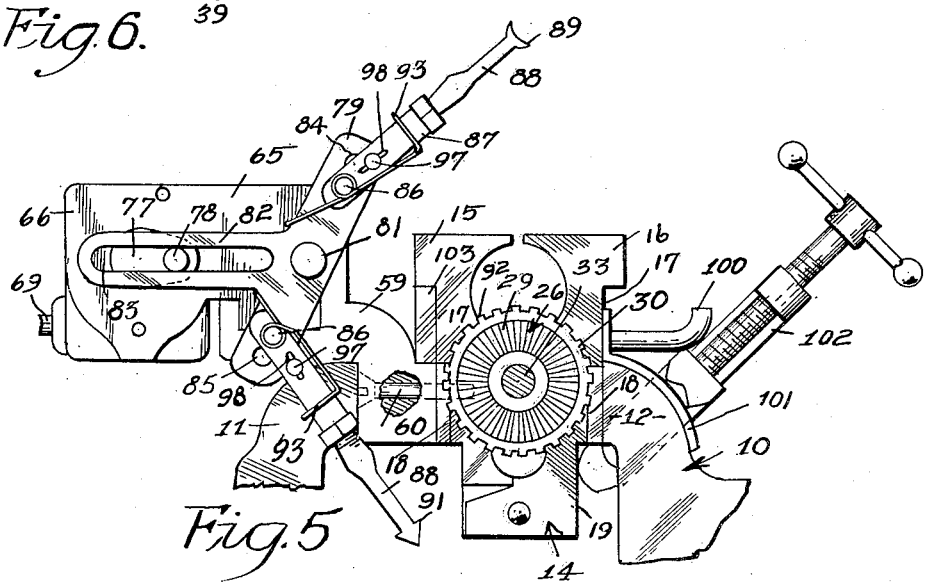
Inventor
Raymond P. Norton
by Alfred G. Hague atty Patented May 15, 1951

2,552,998

UNITED STATES PATENT OFFICE 2,552,998

MACHINE FOR REFACING PIPE FITTINGS

Raymond P. Norton, Algona, Iowa

Application August 2, 1946, Serial No. 688,022

8 Claims. (Cl. 90—12)

This invention relates to a device for facing the coacting surfaces or seats, of a pipe fitting, of the type fixed to the adjoining ends of pipe sections and secured together by means of a coupling sleeve, and more particularly to a power operated device for imparting rotation to a cutter tool rotatably mounted in a frame or bracket supported by the shoulder of the fitting and the corresponding end of the pipe section.

The invention further relates to a power operated means for imparting rotation to the facing cutter of that type of machine illustrated and described in my co-pending application, Serial No. 640,122, filed January 9, 1946, Patent No. 2,490,371, issued December 6, 1949. The said application discloses a hand operated machine for the purpose of refacing tapered or recessless sanitary ferrules which are secured to the pipe by expanding the pipe into the ferrule, or by soldering or brazing; said machine also includes a pipe clamp designed to firmly hold the pipe at a point near the fitting without distorting the fitting or the surface to be refaced. The machine also includes a refacing tool holder having a clamp adapted to engage the pipe and the shoulder of the ferrule in such a manner that the refacing cutter will be firmly maintained parallel with the face to be refinished even if the ferrule is not exactly at right angles to the longitudinal axis of the pipe on which the fitting is mounted; hand actuated means is also provided for feeding the cutter to the surface to be refaced. The cutter is hand operated by means of radial arms provided for that purpose. Movement is imparted to the cutter by grasping both arms and moving them through an angular distance of substantially 180° after which the relative position of the operator's hands and arms are alternated, the cutter is again moved through an angle of 180°, the cutter is therefor rotated intermittently in one direction with a short rest period between each movement. I find that this is very desirable in refacing comparatively hard and tough material, such as stainless steel, the rest period giving time for the heat to be conducted from the thin cutting edge of the cutter; to prevent dulling of said edges, a slow starting movement of the cutter is desirable to enable the cutter to penetrate the material after which the speed may be accelerated; this is also desirable to eliminate chattering and to speed up the refacing operation. The hand operated machine above described gives very satisfactory results for refacing the fittings when assembled or maintaining the fittings. However, when a large amount of this work is to be done, the work becomes laborious and some power mechanism is required.

It is therefore the object of my invention to provide a cheap, simple and efficient power transmission device which can be easily and quickly connected to the pipe clamp and when so attached provides means for imparting intermittent rotary movement to the cutter at accelerated speeds.

More specifically it is the object of my invention to provide a power transmission device to be used in connection with a hand actuated machine for facing pipe fittings, so constructed and arranged that a small electric hand drill may be utilized as power for operating the transmission device.

A further object of my invention is to provide in a machine employing a tool for facing a pipe fitting, an improved power transmission device which may be easily and quickly attached and when so attached provide means whereby the tool may be operated either by power or by hand.

A further object of my invention is to provide in a machine for facing a pipe fitting employing a pipe clamp and a cutter supporting frame adapted to operatively support various types of cutters, power means adjustably mounted on the clamp for operating any one of a number of types of cutters carried by said cutter frame.

Another object is to provide an improved means for stabilizing the cutter as it is operated to prevent vibration and chattering.

My invention consists in the construction, arrangement and combination of the various parts of the device, whereby the objects contemplated are attained, as hereinafter more fully set forth, pointed out in my claims, and illustrated in the accompanying drawings, in which:

Fig. 1 is a side elevation of my improved power transmission device as applied to the cutter of a machine for refacing the adjoining ends of pipe couplers, a portion of the refacing mechanism being broken away.

Fig. 2 is a plan view of the same with the drive motor removed.

Fig. 3 is a sectional view taken on the line 3—3 of Fig. 2.

Fig. 4 is a detailed sectional view taken on the line 4—4 of Fig. 1.

Fig. 5 is a side elevation of my improved power transmission device with the front cover plate removed and the operating pawls locked to inoperative position.

Fig. 6 is a diagrammatic longitudinal sectional view of a pipe and its coupler ferrule, the refacing cutter and the supporting frame for supporting the cutter.

Fig. 7 is a diagrammatic sectional view similar to Fig. 6 showing the coupler ferrule to co-act with the one illustrated in said figure.

Fig. 8 is an enlarged detail sectional view of the auxiliary tool centering device.

Referring to the drawings I have used the reference numeral 10 to indicate a machinist vice of ordinary construction comprising jaw members 11 and 12, the vice including the ordinary handle 13 by means of which the jaws of the vice are moved to open and closed positions. Supported between the jaws is a pipe clamp 14 similar to that illustrated and described in my co-pending application above referred to. Said clamp includes a pair of pivoted jaws 15 and 16 having step portions 17, 18 and 19 and a series of different sized pipe openings 20 for clamping a pipe of corresponding size.

One of the step portions is clamped between the jaws 11 and 12 of the vice 10 for rigidly mounting a pipe 21, having at one end a coupling fitting 22. Said fitting comprises a ferrule or sleeve portion 23, a shoulder portion 24 and a coupling face 25.

A cutter 26 is provided for refacing the portion 25 comprising a body 27 and a conic shell 28 having its inner and outer surfaces provided with teeth 29; the body is formed with a screw threaded opening 31 adapted to be mounted on the screw threaded end 32 of a shaft 33 having an angular portion 35 at its opposite end 36. The shell is also provided with a ratch 30. The shaft 33 is slidably mounted in a support 37.

The inner end of the support is provided with radial arms 38 pivotly supporting parallel links 39 to which are connected dogs 41 adapted to engage the shoulder 24 and the ferrule 23 with the center of the shaft 33 in alignment with the longitudinal center of the pipe 21. The dogs are locked in position by a cone 42 threaded on the support 37 and engaging the bevelled ends of the links 39, the cone is operated by handles 43. The shaft 33 is rotated by handles 44 carried on the head 45. Threaded in the outer end of the shaft is a shaft 46 rotatably mounted in the head 45, a hand wheel 47 provides means for rotating said shaft and provides means for feeding the cutter 26 to the face 25.

The above is a brief description of the hand operated machine described in said co-pending application, with the exception that the cutter did not have the ratch 30. In order to further stabilize the cutter I have formed the inner end of the shaft 33 with a threaded opening 48 for receiving the threaded end of the shaft 49, the opposite end of which is provided with centering device 51 rotatably mounted on a stud 52 threaded in the inner end of the shaft 49. The centering device 51 comprises a disc 53 having a threaded hub 54 and a bevelled periphery 55, a second disc 56 is threaded on the hub 54 and provided with a bevelled periphery 56a. The opposite bevelled peripheries form an annular groove 57 for supporting an annular coiled spring 58. By rotating the disc 56 relative to the disc 53 it will be seen that the spring 58 may be expanded or contracted to fit the inner surfaces of slightly different diameters. This center device provides means to absorb vibrations and chattering of the cutter as it is operated and also means for firmly holding the cutter to the surface being refaced.

My improved power transmission device comprises a supporting bracket or frame 59 including a base member 61 fixed to one of the steps 17 by screws 60, in which is slidably mounted a block 62 having slots 63 to receive bolts 64 adjustably mounted in the base 61 by means of a screw 70; fixed to one end of the block 62 is an upright plate 65 having a laterally extending portion 66. Fixed to the back side of the portion 66 is a gear casing 67 by means of screws 68. Rotatively mounted in the lower side of the gear casing is a drive shaft 69 having its outer end extending through the packing member 71 and provided with a recessed coupler unit 72. The inner portion of the shaft 69 has fixed thereon a worm 73 in mesh with a worm gear 74 mounted on the inner end of the shaft 75. Said shaft is rotatably mounted in the plate 65 having on its forwardly projecting end a crank arm 77 in which is mounted a wrist pin 78.

Mounted adjacent to the front side of the plate 65 is a rock bar 79 by means of a pivot pin 81, the central portion of said bar having a horizontal portion 82 provided with a slot 83 adapted to receive the wrist pin 78 in such a manner that, as the crank 77 is rotated, the portion 82 and the bar 79 will be oscillated for the purpose hereinafter made clear. Each end of the bar 79 is provided with a pair of openings 84 and 85; mounted in one of each of the pair of openings 84 and 85, is a pivot pin 86. Pivotly mounted on each pin 86 is a pawl 87; adjustably mounted in the outer end of each pawl 87 is a ratchet engaging portion 88. The outer end of the upper portion 88 is provided with prongs 89 while the lower portion 88 has its outer end provided with hook portions 91, said portions 89 and 91 being adapted to engage the teeth 92 of the ratch 30, whereby intermittent rotation will be imparted to the cutter as the bar 79 is oscillated.

The pawls 87 are maintained in contact with the ratch in a yielding manner by means of springs 93. Each of the pawls 87 is provided with a slot 94 for receiving the bar 79. Each end of the bar is provided with notches 95 and 96 for receiving lock pins 97 slidably mounted in slots 98 in the members 87, thus providing means whereby the pawls may be locked to open position as illustrated in Figure 5 with the pawls out of engagement with the ratch 30, to permit the pipe 21 and the fitting 22 to be easily removed. The pipe 21 is removed by first grasping the rod 13 and loosening the jaws 11 and 12 after which the upper ends of the clamps 15 and 16 may be separated. The clamp 16 is provided with an opening 99 for receiving a hook-like rod 100 for slidably supporting a plate 101 which is clamped to the jaw 12 by a clamp 102. The rod 100 holds the clamp 16 in contact with the jaw 12 at such times as when the clamps 15 and 16 are moved to open position for changing or adjusting the pipes.

In Figure 1 the pipe 21 is shown in the top opening 20 and a smaller pipe is illustrated in the second smaller opening 20 in which case the bracket 59 is lowered to the step 18 as illustrated in Fig. 5 and secured in position by the screws 60. A spacer block 103 is provided to assist in holding the bracket against movement relative to the clamp 15. A cover plate 104 is provided for the crank 77 and the arm 82, having at one end an opening 105 for receiving the outer end of the pin 81, a washer 106 and a cotter key secure one end of the cover plate in position, screws 108 fasten the other end of the plate. An electric hand drill 109 provides means for rotating the shaft 69; the shaft 110 has a hexagonal plug 111 adapted to enter the hexagonal socket 72 in a detachable manner.

In the practical operation of my power operated device I first clamp plate 101 to the jaw member 12 in the manner illustrated in Figs. 1, 2 and 5 by means of the clamp 102. The bracket 59 is secured to the step 17 by the screws 60, after which the clamps 15 and 16 are secured between the jaws 11 and 12 after first placing the rod 100 through the opening 99 of the plate 101 with the jaw 11 engaging a shoulder 112 of said bracket 59. The jaws 11 and 12 are then closed by the rod 13 placing pressure on the shoulder 112 and the clamps 15 and 16 to firmly hold the pipe 21.

By this arrangement the pressure between the jaws 11 and 12 assist the screw 60 in rigidly holding the bracket 59 in operative position. The shaft 33 of the cutter frame is fitted with a suitable cutter to fit the particular type of fitting being refaced such as illustrated in Figs. 6 and 7 having a ratchet 30 providing means in addition to the handles 44 for rotating the cutter. The interior teeth of the cutter are placed to engage the face 25 of the fitting 22, pressure being applied to the cutter by the hand wheel 47. The position of the cutter 26 is reversed on the shaft 33 when the face of the co-acting fitting 113 is refaced, as illustrated in Fig. 7 with the external teeth 114 engaging the fitting.

The device is now set up as shown in Fig. 5 with the pawls 87 locked in an inoperative position. The pawls may be moved to operative position by sliding the pins 97 out of engagement with the slots 95 and 96 permitting the pawls to swing to operative position with the portion 89 and 91 in contact with the ratch 30 at points diametrically opposite, as illustrated in Figure 1. The screw 70 is for aligning the portions 89 and 91 of the pawls with relation with the toothed face of the ratch 30, said screw 70 being rotatably mounted in a bracket 116 and threaded into the block 62 on which the plate 65 and the gear case 67 are mounted. The block 62 is provided with slots 63 for receiving set screws 64 threaded into the member 62 for fixing the block in any of its adjusted positions. This adjustment provides means whereby the pawls may be adjusted longitudinally of the pipe 21 to co-act with cutters of various designs. Referring to Fig. 6 it will be seen that the pawls assume the dotted line position A while in Fig. 7 they assume the position B, due to the changing of the position of the cutter, end to end.

The shaft 110 is operated by placing the plug 111 of the motor shaft 110 into the socket 72, the motor being supported by the left hand permitting the right hand to be used to control the feed wheel 47.

As the motor is operated the shaft 69 will be rotated and in turn the crank 77 and with it the wrist pin 78, which will slide longitudinally within the slot 83 causing the arm 82 and the bar 79 to be oscillated, and the pawls 87 to be reciprocated, said pawls imparting rotary movement to the cutter in a clockwise direction as viewed in Figure 1.

By this arrangement it will be seen that both pawls will be operated simultaneously and in opposite directions with the portion 89 engaging a tooth of the ratch 30, while the hook portion 91 engages and pulls on a diametrically opposite tooth of said ratch, since both pawls are acting at equal distances from the center of rotation, torque will be applied to the cutter with no tendency to move it either to the left or right or transversely in either direction, with no tendency of the power as applied to the cutter to move the cutter and its supporting frame out of alignment with the fitting being refaced.

The crank 77 and the lever 82 provide means whereby slow and powerful force is applied to the cutter 26 each time the wrist pin 78 begins the one-half revolution of its power or working stroke, the speed being accelerated during the first one-fourth revolution and reduced on its second one-fourth revolution. If the crank is operated in a clockwise direction as viewed in Figure 5 it will be seen that the power stroke will begin with the pin at its lower position of movement. The pin will then move toward the outer end of the slot, thus taking advantage of the full length of the arm during the power stroke. The angular movement of the cutter can be varied by adjusting the pins 86 in the holes 84 and 85 provided for that purpose.

Thus it will be seen that I have provided a power transmission device particularly adapted to be used in connection with my hand operated machine for refacing the ends of pipes or pipe fittings when the power transmission device is used, the entire refacing operation is usually done by power. It sometimes happens that it is desirable to finish the work by handpower. This can be easily done by simply disconnecting the motor from the coupling 72, then manually operating the cutter by the handles in the usual manner.

I claim:

1. In a device for refacing the seat of a pipe fitting, comprising a pipe clamp adapted to support a pipe and its fitting in position for refacing its seat, a tool for refacing said seat including a ratch and cutter teeth, means for mounting the tool to rotate in a plane parallel with said seat, speed reducing mechanism including a power take-off crank, means for securing said speed reducing mechanism to said clamp, a lever pivotly supported at its central portion including a slotted arm for receiving said crank, a pawl pivoted to each end of said lever, and yieldable means for retaining the free end of said pawls in operative relation with said ratch.

2. A device for reseating a pipe fitting while mounted on the pipe, the fitting having an annular shoulder parallel with the face of its seat, a clamp for holding the pipe and said fitting in position to be refaced, a rotatable cutter for refacing said seat, having a ratch, means rotatably supporting said cutter in operative position with its cutting face parallel with said annular shoulder, means for imparting intermittent rotation to said cutter at variable speeds, said means comprising a power operated speed reducing mechanism including a power take-off crank, means adjustably securing said speed reducing mechanism to said clamp, a lever pivotly supported at its central position including a slotted arm slidably receiving said crank, a pawl pivoted to each end of said lever, and yieldable means for retaining the free ends of said pawls in operative relation with said ratch at points diametrically opposite.

3. In a device for refacing the seat of a pipe fitting, comprising a pipe clamp adapted to support a pipe and its fitting in position for refacing its seat, a tool for refacing said seat including a ratch and cutter teeth, means mounting the tool to rotate in a plane parallel with said seat, power operated speed reducing mechanism including a bar pivotally supported at its central portion, a pawl pivoted to each end of said bar, and yieldable means for retaining the free ends of said pawls in operative relation with said ratch.

4. A device for refacing a pipe fitting, of the type having an annular shoulder, while on the pipe, comprising in combination, a clamp for holding the pipe and fitting positioned to reseat the fitting, a rotary cutter for refacing said seat, having a ratch for imparting rotation thereto, means supported by the pipe and said annular shoulder rotatively supporting said cutter to operate in a plane parallel with said shoulder, means for feeding said cutter to said seat, means for imparting intermittent rotation to said cutter at variable speeds, comprising a power operated speed reducing mechanism, a pair of pawls supported in a plane common to said ratch and engaging said ratch at diametrically opposite points, means actuated by said speed reducing mechanism for imparting reciprocal movement to said pawls at variable speeds.

5. A device for refacing a pipe fitting, of the type having an annular shoulder, while on the pipe, comprising in combination, a clamp for holding the pipe and fitting positioned to reseat the fitting, a rotary cutter for refacing said seat having a ratch for imparting rotation thereto, means supported by the pipe and said annular shoulder rotatively supporting said cutter to operate in a plane parallel with said shoulder, means for feeding said cutter to said seat, means for imparting intermittent rotation to said cutter at variable speeds, comprising a power operated speed reducing mechanism, means for adjustably supporting said speed reducing mechanism to move longitudinally of said pipe, a pair of pawls supported in a plane common to said ratch and engaging said ratch at diametrically opposite points, means actuated by said speed reducing mechanism for imparting reciprocal movement to said pawls at variable speeds.

6. A device for refacing a pipe fitting while on the pipe, of the type having an annular shoulder, comprising in combination, a clamp for holding the pipe and fitting positioned to reseat the fitting, a rotary toothed cutter for refacing said seat having a ratch for imparting rotation thereto, means supported by the pipe and said annular shoulder rotatably supporting said cutter with its teeth to operate in a plane parallel with said shoulder, means for feeding said cutter to said seat, means for imparting intermittent rotation to said cutter as variable speeds, said means comprising a power operated speed reducing mechanism including a power take-off crank, means securing said mechanism to said clamp, a lever pivotly supported at its central portion including a slotted arm for receiving said crank, to impart oscillation to said lever as the crank is rotated, a pawl pivoted to each end of said lever, and yieldable means for retaining the free ends of said pawls in operative relation with said ratch at points diametrically opposite.

7. A device for refacing a pipe fitting while on the pipe, of the type having an annular shoulder, comprising in combination, a clamp for holding the pipe and fitting positioned to reseat the fitting, a rotatable cutter for refacing the seat of the fitting, means rotatably supporting the cutter in operative position with its cutting face parallel with said annular shoulder, means for imparting intermittent rotation to said cutter at variable speeds, said means comprising a power operated speed reducing mechanism including a power take-off crank, means securing said mechanism to said clamp, a lever pivotly supported at its central portion including a slotted arm receiving said crank, a pawl pivoted to each end of said lever and yieldable means for retaining the free ends of said pawls in operative relation with said ratches at diametrically opposite points.

8. A machine for facing the end of a pipe comprising a body member having a longitudinally extended bore formed therein, means carried by said body adapted to releasably clamp there between a pipe positioned in substantial coaxial alignment with said bore, a cutter shaft rotatable within said bore having one end extending within said pipe, a cutting tool mounted on said shaft having a portion engaging the end of said pipe, a centering device, comprising, a disc rotatively mounted on the inwardly extending end of said shaft having a threaded hub, a second disc rotatively mounted on said threaded hub, the peripheries of said discs being bevelled to form an annular groove, an annular contact member formed of a yieldable and resilient material supported within said annular groove and adapted to engage the inner surface of said pipe.

RAYMOND P. NORTON.

REFERENCES CITED

The following references are of record in the file of this patent:

UNITED STATES PATENTS

| Number | Name | Date |
|---|---|---|
| 1,846,340 | Jones | Feb. 23, 1932 |
| 2,106,201 | Aab | Jan. 25, 1938 |
| 2,211,183 | Tytus et al. | Aug. 13, 1940 |
| 2,289,631 | Cuda et al. | July 14, 1942 |
| 2,345,349 | Martin | Mar. 28, 1944 |
| 2,416,228 | Sheppard | Feb. 18, 1947 |

FOREIGN PATENTS

| Number | Country | Date |
|---|---|---|
| 8,038 | Great Britain | Apr. 3, 1909 |
| 24,480 | Germany | Oct. 6, 1883 |